Aug. 11, 1953   J. H. MILLER   2,648,820
DIRECT-READING LOW RANGE OHMMETER
Filed July 12, 1950
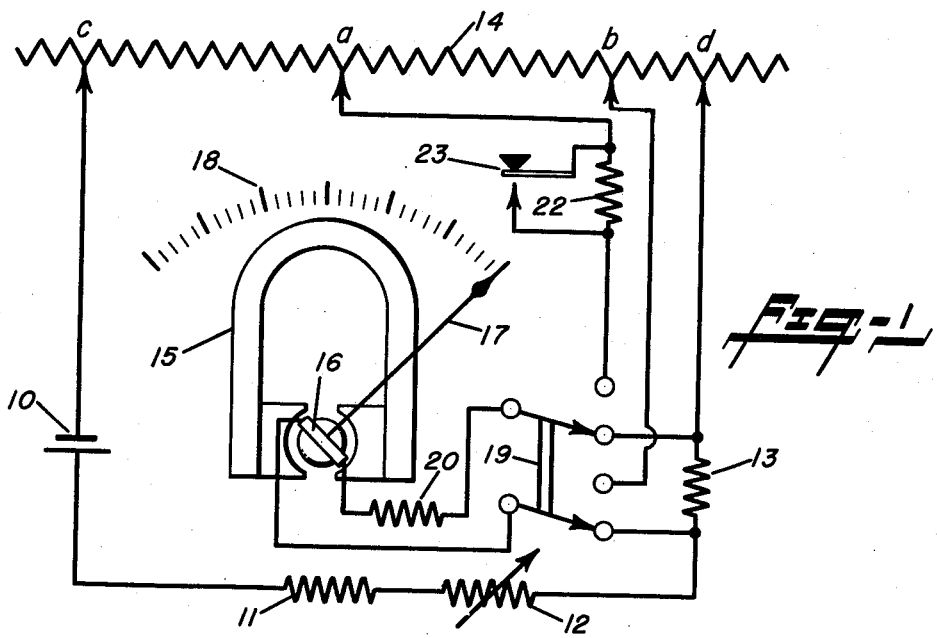
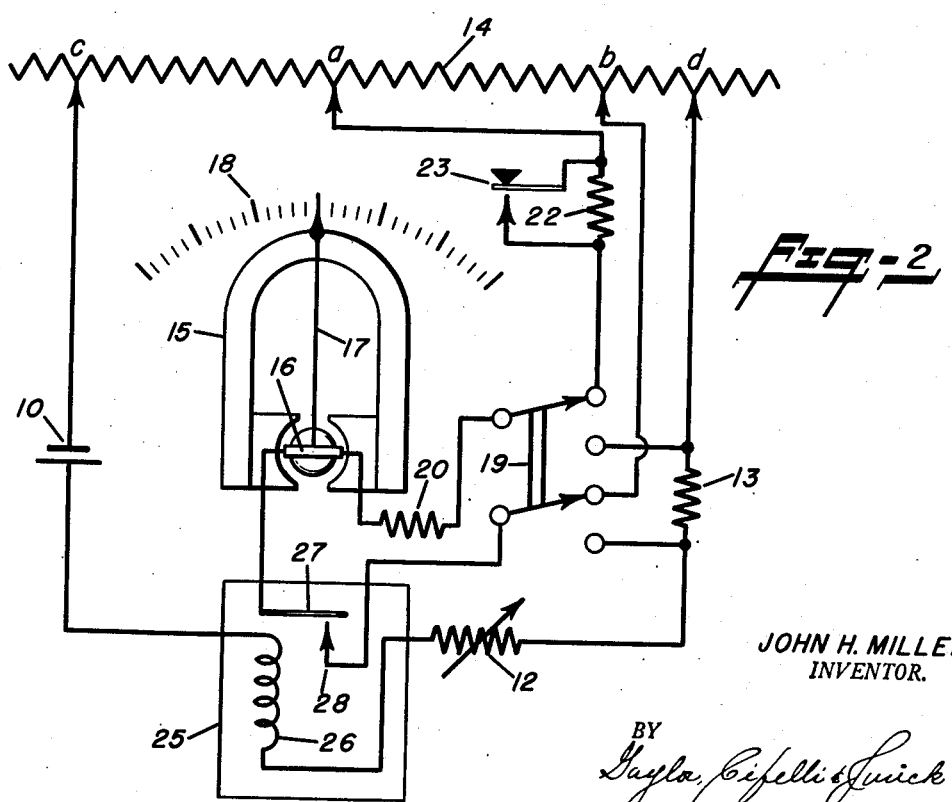
JOHN H. MILLER
INVENTOR.
BY
Gayle, Cifelli & Quick
ATTORNEYS Patented Aug. 11, 1953

2,648,820

UNITED STATES PATENT OFFICE 2,648,820

DIRECT-READING LOW RANGE OHMMETER

John H. Miller, Short Hills, N. J., assignor to Weston Electrical Instrument Corporation, Newark, N. J., a corporation of New Jersey Application July 12, 1950, Serial No. 173,377

6 Claims. (Cl. 324—64)

This invention relates to a low-range, direct-reading ohmmeter commonly referred to as a milliohmmeter and more particularly to a device of this type provided with means for protecting the movable coil of the sensitive indicating instrument from damage due to electrical overloading.

Milliohmmeters of the class contemplated by this invention are employed to measure resistances of low ohmic value such as, for example, the electrical bonding of an aircraft structure, the resistance of a pair of contacts on an electrical circuit breaker, etc. The resistance to be measured, or checked, forms part of a closed electrical circuit that includes a standard resistor and a source of electrical energy such as a battery. A sensitive, D. C. millivoltmeter is connected across the standard resistor and the current flow in the circuit is adjusted by means of a rheostat until the instrument pointer is aligned with the top mark on the scale that may be calibrated directly in ohms or milliohms. The instrument is then transferred to the resistance under test, whereupon the ohmic value of such resistance is indicated directly by the deflection of the pointer relative to the scale. If, however, the instrument is accidentally, or inadvertently, placed across the resistor under test when this resistance is high, say, 100 ohms, or open-circuited, practically the full battery voltage is impressed across the movable coil of the millivoltmeter with consequent damage thereto. To prevent such damage to the coil I provide a relay in the series network, the coil of the relay serving as part of the otherwise necessary ballast resistance and the contacts of the relay being connected in series with the instrument movable coil. The relay contacts are of the "normally-open" type and are closed only when a predetermined magnitude of current flows in the series circuit of which the resistance under test forms a part.

An object of this invention is the provision of a milliohmmeter provided with automatic means for protecting the indicating instrument from damage due to electrical overload.

An object of this invention is the provision of a direct reading ohmmeter of the type wherein a specific amount of current is passed through the resistance under test and the millivolt drop across such resistance is taken as a measure of its ohmic value, said ohmmeter including a relay having a coil connected in series with the resistance under test and a pair of normally-open contacts in series with the movable coil of the indicating millivoltmeter.

An object of this invention is the provision of a direct reading millivoltmeter comprising a series circuit including a current source, a standard resistor and the resistance under test, an indicating instrument having a movable coil, switch means for connecting the movable coil across the standard resistor or the test resistance, a relay having a coil connected in the series circuit, a pair of normally-open contacts on the relay, said contacts connected between the movable coil and the switch means, and means for adjusting the current flow in said series circuit to a predetermined magnitude.

These and other objects and advantages will be apparent from the following description when taken with the accompanying drawings. The drawings are for purposes of illustration and are not to be construed as defining the scope or limits of the invention, reference being had for the latter purpose to the appended claims.

In the drawings wherein like reference characters denote like parts in the several views:

Figure 1 is a circuit diagram of a milliohmmeter; and

Figure 2 is a circuit diagram of a milliohmmeter provided with a protective relay in accordance with this invention.

Referring now to Figure 1, a direct-reading, low-range ohmmeter, of the type contemplated by this invention, comprises a series electrical circuit including a current source such as the battery 10, a ballast or current limiting resistor 11, a rheostat 12, a standard resistor 13 and the resistance under test 14. The indicating instrument is a D. C. millivoltmeter comprising a permanent magnet 15, and a movable coil 16 carrying the pointer 17 that cooperates with a scale 18 which may be calibrated directly in ohms or milliohms. A double pole, double throw, switch 19 serves to connect the instrument movable coil and its adjusting resistor 20 across the standard resistor 13 or across the resistance under test, as shown. With the switch 19 closed in the illustrated position, the movable coil of the instrument will respond to the millivolt drop across the standard resistor 13. It will be apparent the current flow in the series circuit can be adjusted to a selected magnitude by means of the rheostat 12, provided the resistance under test between the points c, d, is of sufficiently low value and, by the same token, within the range of the particular indicating instrument. In actual practice, the current flow is adjusted so that the millivolt drop across the standard resistor will result in an alignment of the instrument pointer with the top mark on the scale 18. Such top mark position on the scale may be marked with the actual, preadjusted ohmic value of the standard resistor. The switch 19 is now thrown to connect the instrument movable coil across the test resistance 14, whereupon the movable coil will respond to the millivolt drop across such resistance and the ohmic value thereof may be read directly by noting the new position of the pointer relative to the scale. The illustrated arrangement is of the four terminal type wherein the contact points c, d, are placed outside the resistance under test and the contact points a, b, are placed specifically at the points between which the resistance is to be measured. Such arrangement avoids a voltage drop due to contact resistance at the main current terminals c, d. As a practical example, with 100 ma. flowing through the resistance under test and the instrument being calibrated for 10 millivolts, full scale, the top mark of the instrument scale was marked 0.10 ohm or 100 milliohms. With a 100 division scale the instrument can be used to measure accurately resistance values as low as 1 milliohm.

In the illustrated arrangement the range-multiplying resistor 22 is connected in series with the movable coil of the instrument when the latter is connected across the resistance under test. The value of this resistor may be made some multiple of the combined value of the resistor 20 and movable coil 16 thereby providing a multi-range instrument. Specifically, if the ohmic value of the resistor 22 is equal to that of the resistor 20 and the movable coil 16 the scale range of the instrument is multiplied by a factor of 2 and the scale may be so marked. The short-circuiting switch 23 serves to cut out the resistor 22 whereupon the basic scale range of the instrument will apply. It will be apparent other scale multiplying factors may be obtained by assigning appropriate values to the instrument resistors.

In the Figure 1 arrangement, if the resistance under test is of relatively high ohmic value, say 100 ohms, or open-circuited, and if, under this condition, the switch is thrown to connect the instrument movable coil across such resistance, practically the full battery voltage is applied across the movable coil with consequent damage thereto. To prevent such occurrence I provide a protective relay arranged to disconnect the instrument movable coil from the transfer switch unless the current flow through the resistance under test exceeds a predetermined, minimum magnitude.

As shown in Figure 2, the protective relay 25 has an operating coil 26 connected in the main battery circuit, said coil effectively taking the place of the ballast resistor 11 of the Figure 1 circuit. The relay is provided with a movable contact 27 and a cooperating, stationary contact 28. These contacts are of the normally-open type, that is, closure of the contacts is established only when sufficient current flows through the operating coil to attract the movable contact thereto, as is well known. As shown in the drawing, the relay contacts are connected in the lead between the instrument movable coil 16 and the transfer switch 19. With the relay coil having a resistance of approximately 10 ohms, and so adjusted that it will close the contacts 27, 28 when the current flow through the coil is approximately 100 milliamperes, the relay will keep the instrument coil circuit open unless the resistance 14 under test is under a few ohms; since it is only if this resistance is low that sufficient current can flow through the relay coil. If the resistance under test is over 5 ohms, or is open-circuited, then insufficient current will flow through the operating coil of the relay, and the instrument movable coil circuit will remain open and no damage can occur. It may here be pointed out that if the resistance of a pair of contacts on a circuit breaker is being checked and the circuit breaker opens, then the relay 25, which preferably is of the high speed type, opens quickly and prevents the instrument pointer 17 from being slammed.

While I have illustrated and described my invention by reference to circuit diagrams, it will be apparent the various components may be housed within a suitable case provided with binding posts for making connection to the test resistance.

Having now described my invention in detail in accordance with the patent statutes, various changes and modifications will suggest themselves to those skilled in this art, and it is intended that such changes and modifications shall fall within the spirit and scope of the invention as recited in the following claims.

I claim:

1. In a direct-reading ohmmeter of the type comprising a standard resistor connected to a source of D. C. current, means for connecting a resistance to be measured in series with the standard resistor, means for adjusting the current flow through the standard resistor and the resistance to be measured, a D. C. millivoltmeter having a scale calibrated in ohmic values, and a switch operative to connect the said millivoltmeter across the standard resistor or across the resistance to be measured, the improvement comprising a relay having an operating coil connected in series with the resistance to be measured and a set of normally-open contacts connected between the millivoltmeter and the switch.

2. The invention as recited in claim 1, wherein the relay is adjusted to close its contacts when a current of approximately 100 milliamperes flows through the relay operating coil.

3. A direct-reading, low-range ohmmeter comprising a standard resistor, a battery and a rheostat forming a series circuit with a resistance to be measured; a D. C. millivoltmeter having a movable coil and a pointer cooperating with a scale of ohmic values; a relay having an operating coil connected in the said series circuit; a set of normally-open contacts on the relay; a double-pole, a double-throw switch; leads connecting one set of switch contacts to the standard resistor; leads connecting the other set of switch contacts across the resistance to be measured; a lead connecting one side of the movable coil to a movable blade of the switch; and separate leads connecting the relay contacts to the other side of the movable coil and to the other movable blade of the switch.

4. The invention as recited in claim 3 including a range-multiplying resistor connected in series with the movable coil, and a short-circuiting switch connected across said range-multiplying resistor.

5. A device for determining the electrical resistance of a test member, said device comprising a standard resistor connected in series with a source of D. C. current, means for connecting the test member in series with the standard resistor, means for adjusting the current flow in the series circuit to a predetermined value, a D. C. millivoltmeter including a pointer movable over a calibrated scale, manually-operable means for electrically connecting the millivoltmeter across the standard resistor or across the test member, and automatic means responsive to the current flowing in the series circuit and interposed between the millivoltmeter and the manually-operable means, said automatic means opening the electrical circuit between the millivoltmeter and the manually operable means when the current flowing in the series circuit falls below a predetermined value.

6. The invention as recited in claim 5 including a range-multiplying resistor connected in series with the millivoltmeter and a short-circuiting switch connected across said range-multiplying resistor.

JOHN H. MILLER.

References Cited in the file of this patent

UNITED STATES PATENTS

| Number | Name | Date |
|---|---|---|
| 1,893,700 | Enlund | Jan. 10, 1933 |
| 1,971,146 | Rovere et al. | Aug. 21, 1934 |
| 2,400,190 | Clark | May 14, 1946 |
| 2,469,703 | Simkins | May 10, 1949 |